United States Patent [19]

Neff

[11] 4,386,433
[45] May 31, 1983

[54] CHARACTER DOUBLING ELIMINATOR

[75] Inventor: Marion W. Neff, Euless, Tex.

[73] Assignee: Recognition Equipment Inc., Irving, Tex.

[21] Appl. No.: 246,977

[22] Filed: Mar. 24, 1981

[51] Int. Cl.³ .............................................. G06K 9/22
[52] U.S. Cl. ...................................... 382/48; 382/59; 382/68
[58] Field of Search ........... 340/146.3 SY, 146.3 MA, 340/146.3 H, 146.3 AC; 382/48, 59, 68; 235/436, 437, 438, 440, 454; 250/557, 561, 578

[56] References Cited

U.S. PATENT DOCUMENTS

| 3,271,740 | 9/1966 | Rabinow | 340/146.3 H |
| 3,947,817 | 3/1976 | Requa et al. | 340/146.3 MA |
| 3,964,022 | 6/1976 | Martin | 340/146.3 H |
| 4,118,687 | 10/1978 | McWaters et al. | 340/146.3 SY |
| 4,180,799 | 12/1979 | Smith | 340/146.3 MA |
| 4,180,800 | 12/1979 | Isshiki et al. | 340/146.3 SY |

Primary Examiner—Leo H. Boudreau

[57] ABSTRACT

A circuit utilizing four flip flops and a number of gates is used to prevent character doubling when reading optically with a hand held optical character reader. The character can move partially out of and then back into the scanning view without losing character presence, thereby, preventing character doubling or substitution of characters.

4 Claims, 7 Drawing Figures

CHARACTER SCANNED SO THAT EXITS THE
TOP OF THE RETINA AND RETURNS

CHARACTER DOUBLING ELIMINATOR

FIELD OF INVENTION

This invention relates to hand held optical character readers and more particularly to a circuit for preventing character doubling while reading with such readers.

BACKGROUND OF THE INVENTION

In hand held optical character readers such as that described in U.S. Pat. No. 4,075,605 it is possible for the operator to read a character two or more times. This is caused by poor scanning motion by the operator. When the scanning motion is such that a character is being read at either the top or bottom of the scanning array the character can move out of and then back into the array since the white path block conditioning is ignored unless there is white above and below the character. Character presence is lost as soon as the first or last row of the array is found to contain black data. When the character moves back into the scanning array a new character presence is detected and the character is read again.

When a character is read more than once there are two possible indications to the operator. If all the other characters are read then the field will be too long and will not pass the edit rules. This is in a system where fixed fields are read a certain number of characters are in each field. For example, if the line D1234 is scanned such that 2 goes out the top of the array and then comes back, the resolved decision string would be 12234. Since the edit function was checking for a four digit D field the five digit field would be rejected. This is recorded as a "no read". If the same motion that was used to cause the long field was to be repeated but starting past the 4, the resolved decision string would be D1223. This four digit D field would pass the edit rules. However, it would be an incorrect reading of the field which may or may not be noticed by the operator. Even though there apparently was a good reading, the data base would contain two substitutions, an extra 2 and no 4.

SUMMARY OF THE INVENTION

The invention relates to hand held optical character readers and more particularly to a means for maintaining character presence when the top of the character or the bottom of the character goes beyond the scanning array. The character itself is principally within the array, however the top or the bottom may move through the top two or last two rows of photosensitivity elements in the scanning array and character presence still be maintained. Many of the characters that go in and out of the array do not move more than two rows. The results of this is to reduce the doubling of characters by about 30% if only this two row movement is taken into consideration. However for each line that is rejected properly, a line that would have otherwise have been read correctly is rejected. This means that while there is a reduction in the substitution rate, there is also a reduction in the first pass acceptance rate.

Since vertical velocity of a character within the array is relatively small there is still at least an attempt to read characters that will be doubled in either the second or next to last row. If this is remembered then character presence can be maintained until a character either returns to the read area or moves past the read position maintaining character presence preventing multiple reading.

THE DRAWINGS

FIGS. 3a, 3b, 3c, and 3d are flow diagrams of the operation of the circuit.

Figure 1A:
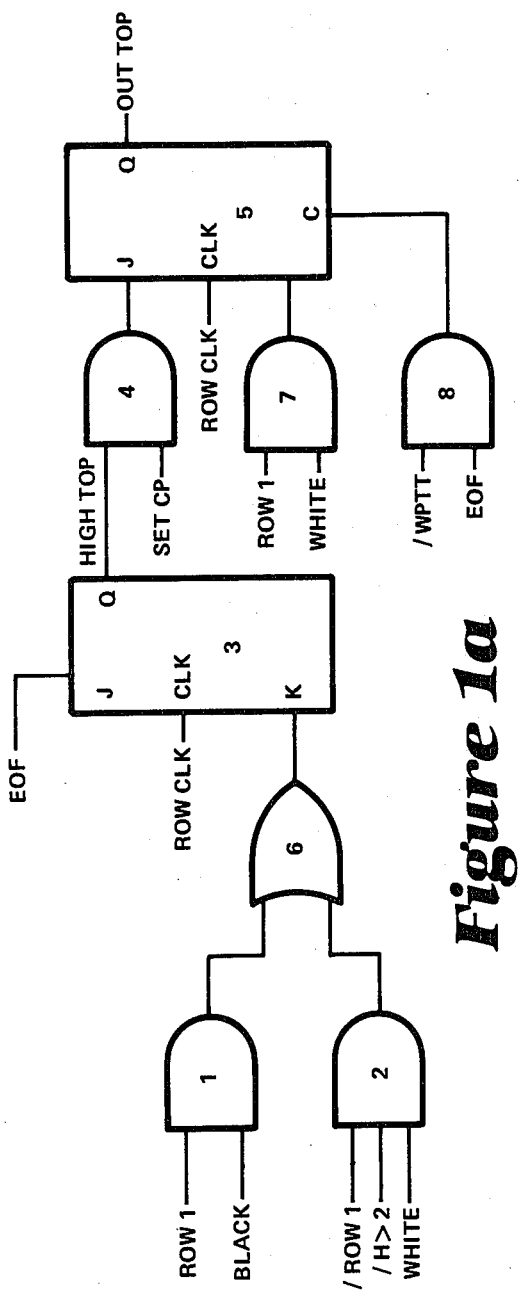
FIGS. 1a and 1b are schematic diagrams of the character doubling eliminator circuit.
Figure 1B:
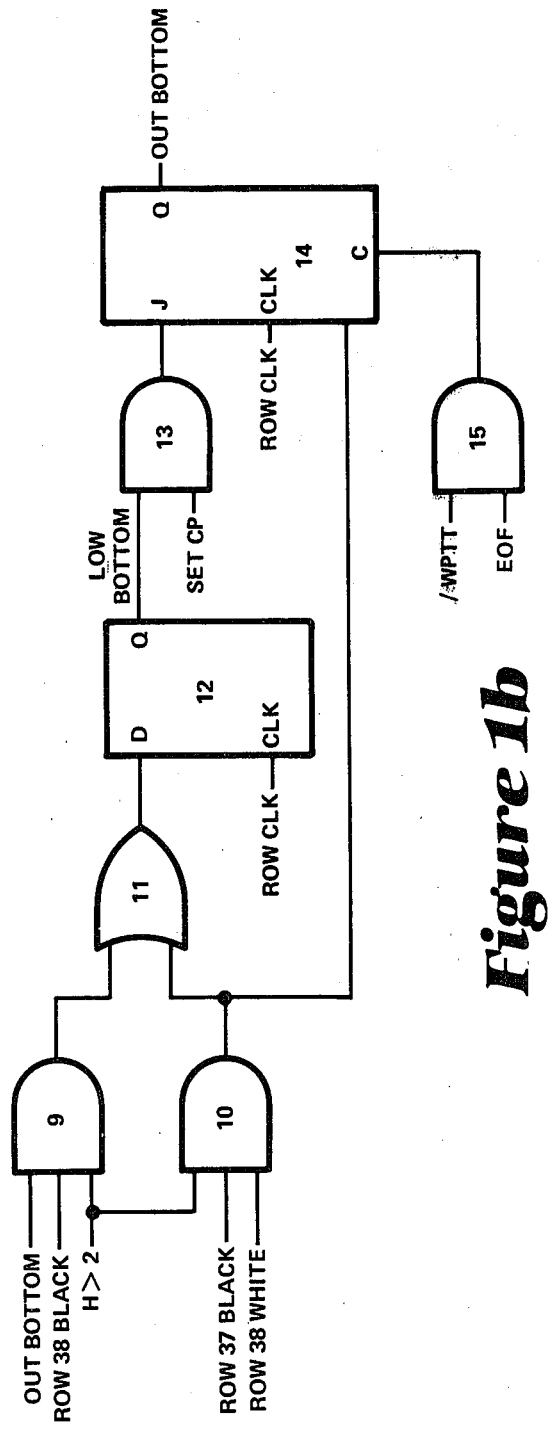

In order to be able to read characters that are either above or below areas containing interference, the detection of the white path trap signal is inhibited when there is black extending into the field of view from either the top or the bottom. When the reader is being moved across a line of characters tracking errors sometimes cause the character to pass out of the field of view. This causes a white path tracer to ignore the character as though it were interference. If the scanning motion continues off the line usually there is no harm, however, if the motion is such that the character returns to the field of view of the white path, the tracer again detects the presence of the character and is read for the second time resulting in a character that is read twice or doubled. FIGS. 1a and 1b are memory circuits which remember when a character temporarily extends out the top or bottom of the reading path and returns to the field of view. FIG. 1a remembers when the character moves out of the top of view and FIG. 1b remembers when the figure moves out the bottom of the field of view.

The circuit illustrated in FIGS. 1a and 1b may be used in conjunction with the recognition system described in U.S. Pat. No. 4,075,605 which uses a photoelectric scanning device having 38 rows of photosensitive elements.

In FIG. 1 the high top flip flop 3 is set when either one of two conditions is met. AND gate 1 is activated. Row 1 is being scanned and it is black AND gate 2 is activated when row 1 is not being scanned and the height of the other character extends through the top two rows and white is present. Either one of these inputs will activate OR gate 6 and High Top Flip Flop 3. With the High Top Flip Flop set, the Out Top Flip flop 5 is activated when there is a Character Presence (CP) indication. Gate 4 provides the output to Out Top Flip Flop 5. Out top Flip Flop 5 is then reset when Row 1 is being scanned and white is present. The Out Top Flip Flop 5 is clocked when there is an End of Frame (EOF) signal and there is no white path trace signal.

The circuit triggering the Lower Bottom flag is shown in FIG. 1b. The input to gates 9 and 10 are the indication that the character has gone out the bottom array when row 38 is black, or row 37 is black and Row 38 is white. The output from the AND gates 9 and 10 goes to OR gate 8 which triggers the Low Bottom Flip Flop 12. When the Low Bottom signal are Character presence and applied to AND gate 13, the Out Bottom Flip Flop 14 is activated. Flip Flop 14 is reset then when row 37 is black and row 38 is white.

If the last row is white and there is black in the next to last row, which is part of an area which meets the minimum size requirements, or the last row is black and the last character had the Out Bottom Flag set, then the Low Bottom Flag is set. It will be reset when the last row is white or the minimum size requirements are not met.

Out Top Flag Flip flop 5 is set as follows: The Out top Flag is set when the High Top Flag is set and the requirements for Character Presence are met. The Out Top Flag is reset during the first frame which does not meet both conditions. For example, row 1 is scanned and row 1 is white.

The Out Bottom Flag Flip Flop 14 is set when the low flag is set and requirements for character presence are met. The Out Bottom Flag is reset during the first frame which does not meet both conditions. For example, row 37 is black and row 38 is white. The use of these four flags allows the recognition of characters in the second and next to last row, maintenance of character presence when a part of the character which is being read leaves the scanned area, skipping over the black which extends into the array when looking for character presence improves decision resolution processing.

Figure 2:
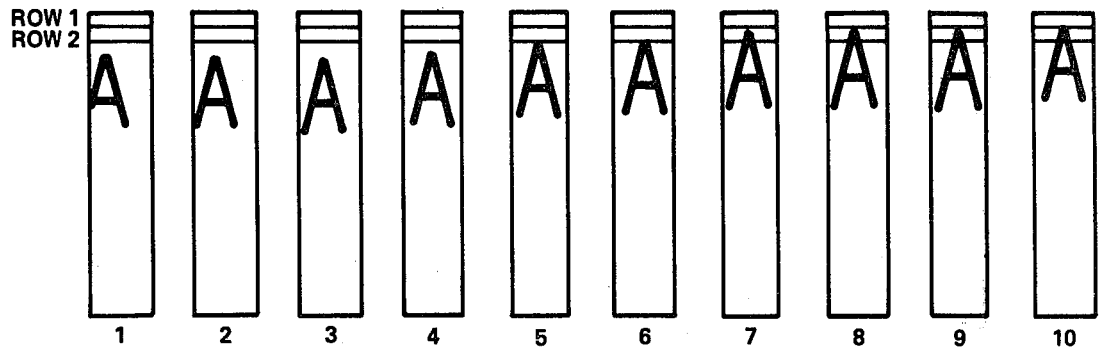
FIG. 2 is an example of the character leaving the top of the array and returning.
Figure 2:
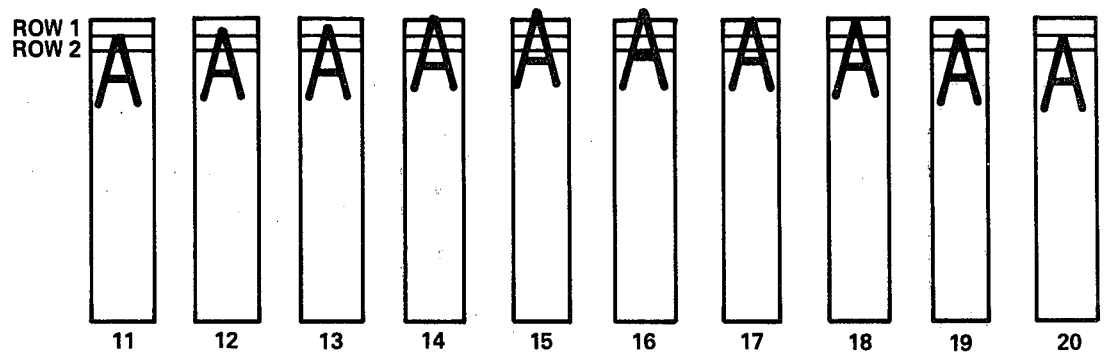
Figure 2:
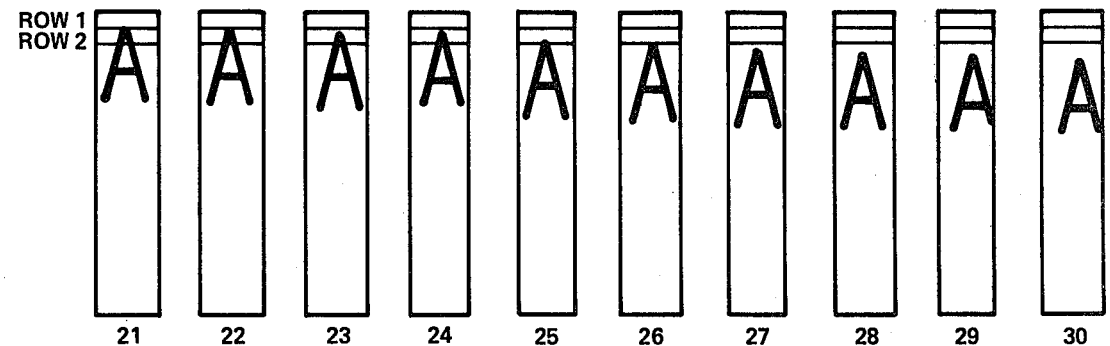
Figure 3A:
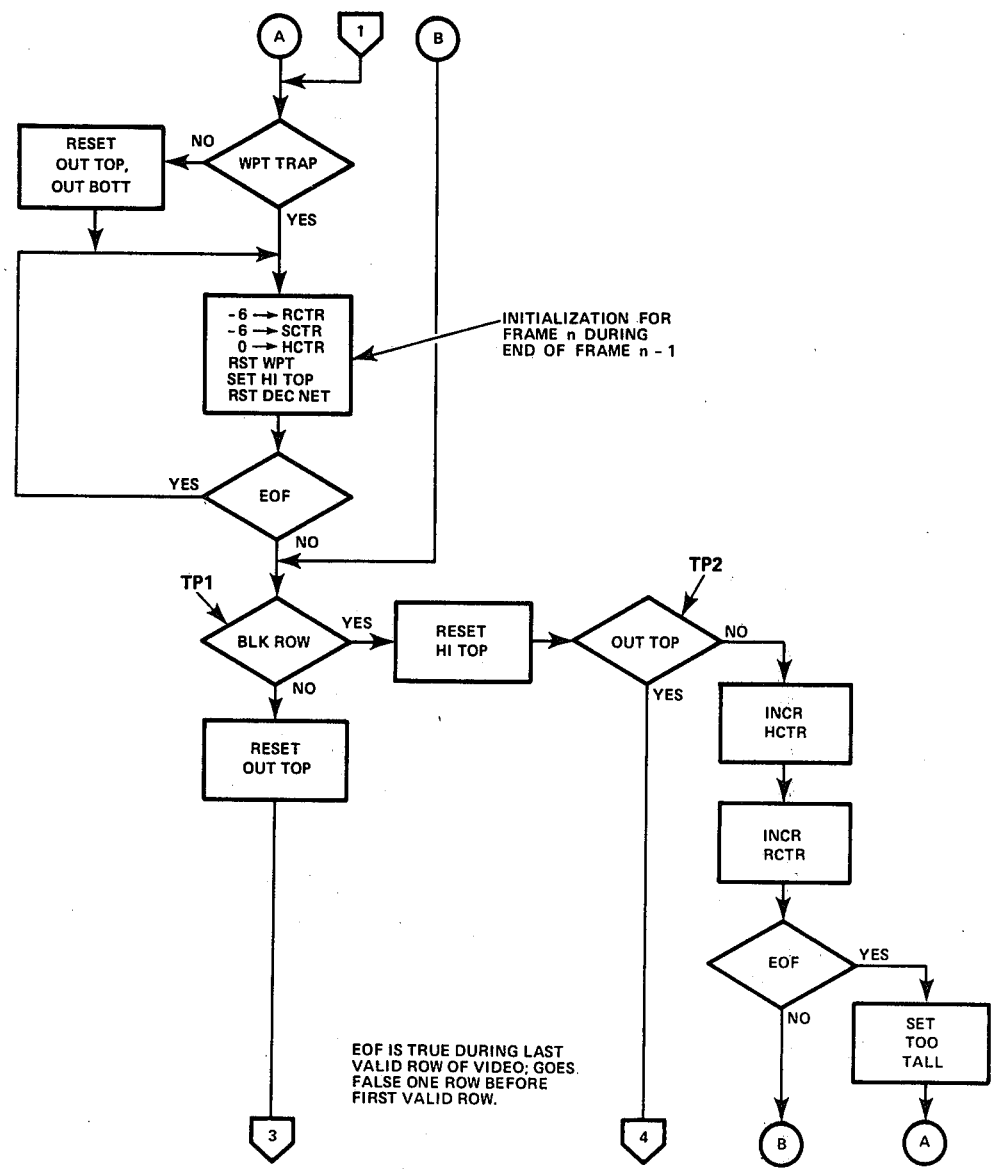
Figure 3B:
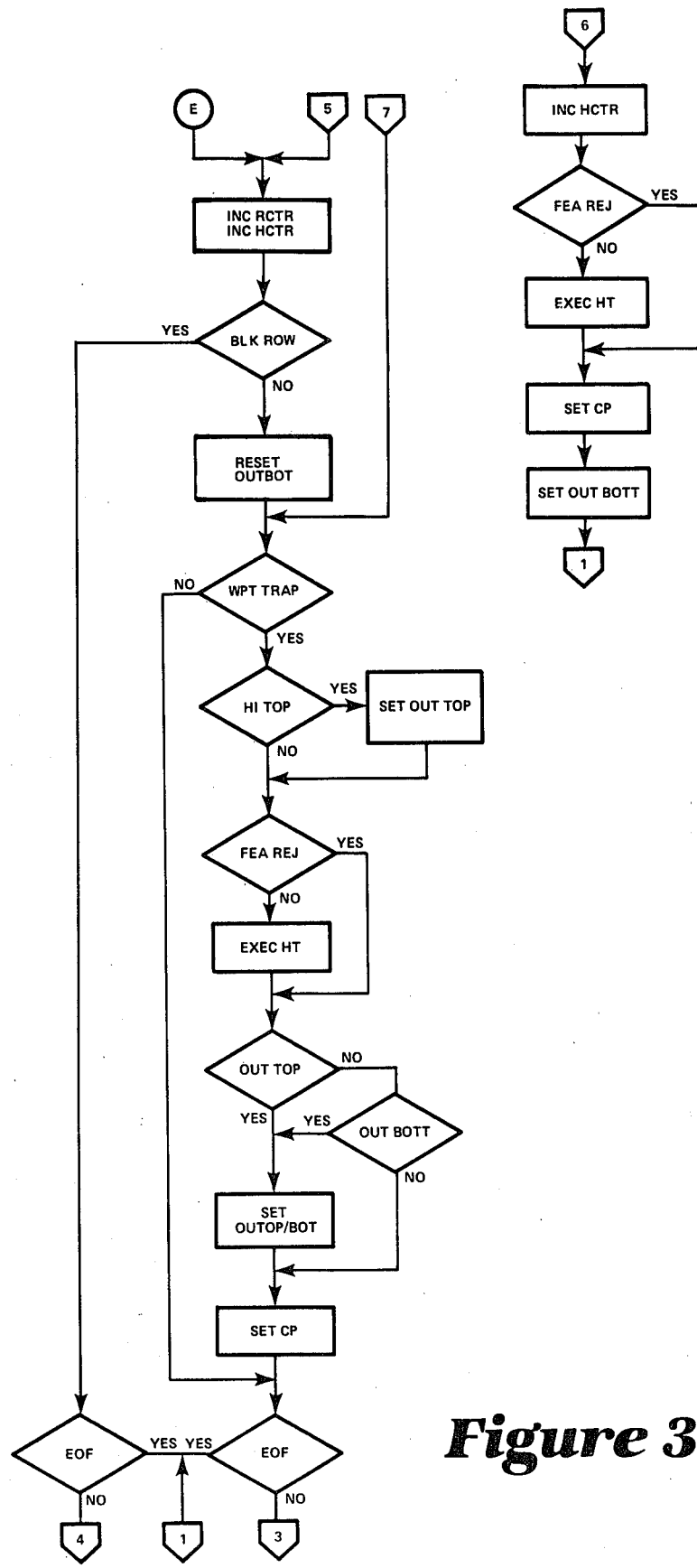
Figure 3C:
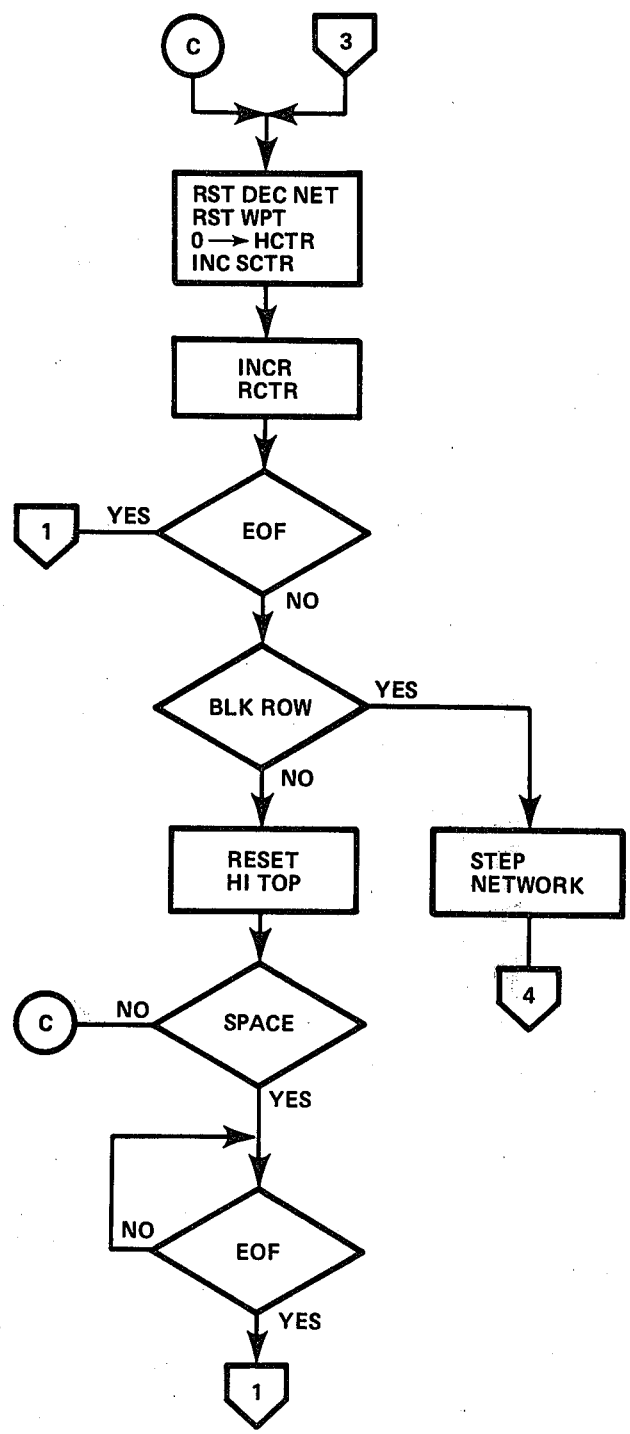
Figure 3D:
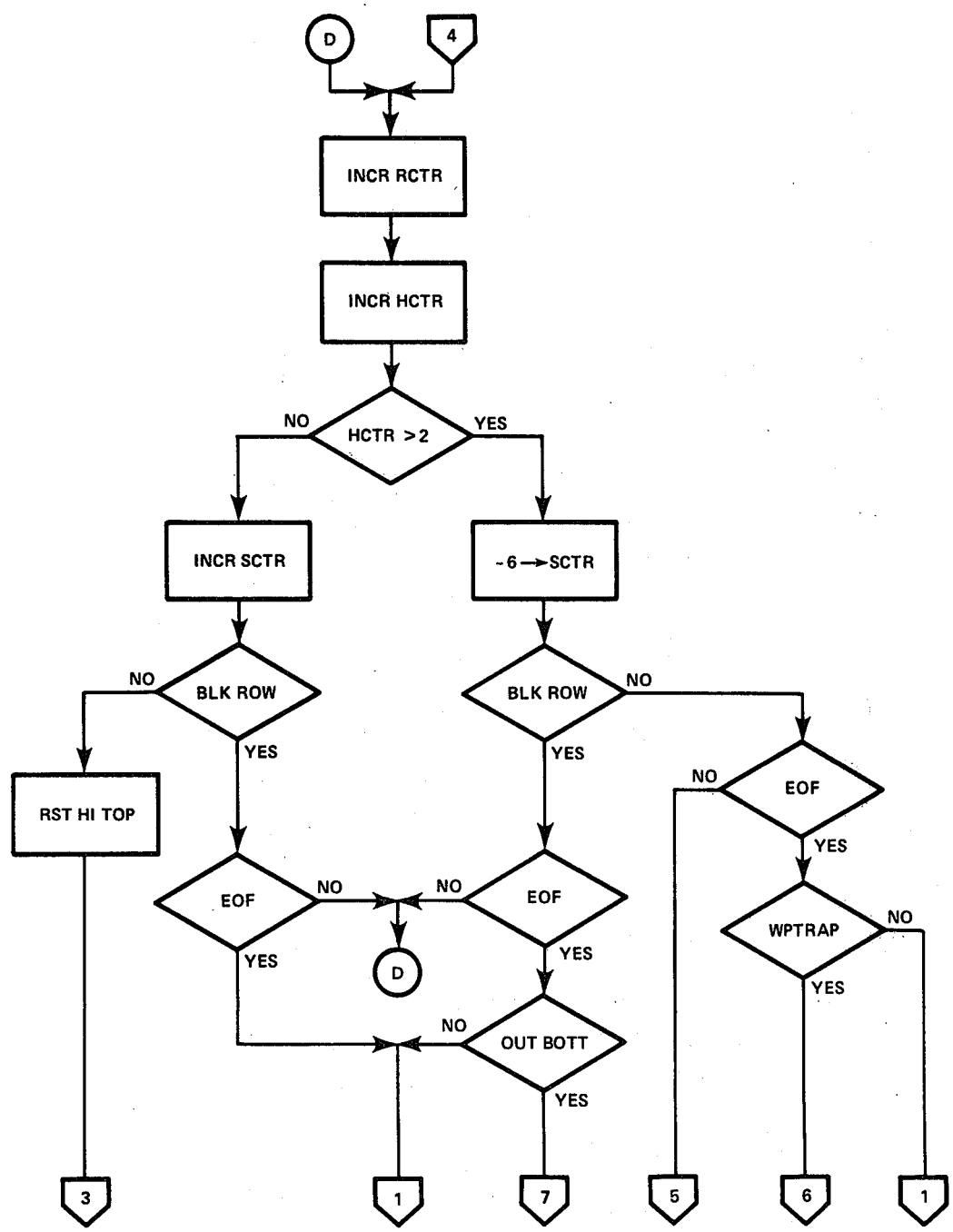

Looking at FIG. 2, an example of the letter A leaving the top of the scanning array and returning is shown. The operation of a character extending through the bottom is essentially the same so it will not be described.

During frames 1 through 6, row 2 is white so the output of gate 1 (FIG. 1a) is false, hence flip flop 3 is never set. Without high top flag being out, top flag can never be set. Therefore the operation of the character presence is normal. For frames 7 through 11 row 1 is white but row 2 is black. High top flag is set. At the bottom of the character the output of AND gate 4 out top is set and high top flag is reset. In the next frame the first row is black and row 2 is black, the output of and gate 1 is true and high top flag is set and out top is reset. At the bottom of the character high top flag is reset and out top flag is set. The out top flag is sent to decision resolution where it is presently unused. For frames 12 through 19 both row 1 and row 2 are black. High top flag is never set and out top flag is never reset. As long as the gate 4 out top flag is set and the other requirements for character presence are met it will be allowed. No attempt to recognize the character is made when out top flag is set. Frame 20 again has row 1 white and row 2 black. The recognition is again enabled and the operation for frames for 20 through 24 is the same as for frames 7 through 11. In rows 25 through 30 both rows 1 and 2 are white and the operation is the same as for frames 1 through 6.

FIGS. 3a, 3b, 3c and 3d are flow charts illustrating the operation of the circuit. In the flow charts the terminals ae illustrated with either numbers or letters and for clarification each of the letter numbers will be prefixed with a "T" to indicate a terminal connection between the flow charts.

During the end frame dead time after each frame of data is processed and conditions are initialized for the next frame, the row and space counter are set to a minus six since this is more convenient than resetting them to zero and detecting count less than six. Reading is inhibited when the row count is less than six. The height counter is set to "0" and the decision network is set to node 0. High tip is set to 1. This is the flip flop which is used to indicate when a character is read with only one white row above it.

When the end of frame time is over, a search is begun for the first white row. Each row is checked at TP1. If it is black, the high top flip flop is reset since the conditions for reading the character whose top is in the second row cannot be met if the first row is black.

At TP2, which occurs during the same row, a test is made on the out top flip flop, indicates that a character that is going out the top of the field of view is being processed. If the out top flip flop is not set when the height and row counters are incremented, a check is made for the end of frame, if it is not the last row, the next row is checked for black. If it is, the last row too tall will be set and control and go to TA. White path trap is tested. If it is true, the process will begin again, if not the processing of the character will be considered complete and Out Top and Out Bottom will be reset and initialization for the next frame will occur.

If at TP2 Out Top is set, control transfers to T4. The height and row counters are incremented, and the height counter is tested to see if it is greater than 2. If it is not, the space counter is incremented and the next row is checked for black. If it is white, High Top is reset and control is transferred to T3. If this row is black, a test is made for End of Frame. If it is true then go to T1. If it is not the end of the frame, then go to TD.

When the test for height is greater than 2 is true, the space counter is reset to a minus 6, and the test for black row is made. As long as each row is black, and the End of Frame has not been reached, the loop from TD to TD will continue. When a white row is found, a check is made for End of Frame. If EOF is true, a test is made to determine if the white path tracer is trapped. If it was not, go to T1. This means that there was no character found in this frame. If the white path tracer is trapped at the end of the frame with only one white row (true if WPT set at this point) the character is processed and out bottom is set.

If the white row did not occur at the bottom of the frame (T5), the row and height counters are incremented and the next row is checked for black. If it is not black, this row will be the second white row and the out bottom is reset to indicate that the system is no longer processing a character which is at the bottom of the field of view. The character decision is then processed. If this point is reached processing a character that was out the top of the field of view, out top is not reset. When the TD to TD loop is completed because of a black row and End of Frame, a test is made for Out Bottom, if it is not set, then go to TD. If it is set go to T7. At T7 a test is made for WPT trap and if it is set, then go process a character decision, if not, go test End of Frame which will be true, and send to T1.

At TP1 a row will be the first white row in a frame. This point can only be reached when the first row is white when processing a character at the top of the field of view. Out top is reset to indicate that the system is no longer processing a character at the top of the field of view. The system goes to T3 and processes the data normally.

What is claimed is:

1. In a character recognition circuit wherein the presence of a scanned character to be read has been determined and the initial or subsequent character or a part of one of the characters is in the field of view of a multi-row scanning array, first means for determining when a portion of a scanned character moves vertically out of the field of view of the scanning array and for providing an output signal indicative thereof, second means for determining when the scanned character returns to the field of view of the scanning array and providing an output indicative thereof, and third means utilizing the outputs of said first and second means to determine the time and extent said scanned character was partially out of the field of view of said scanning array to determine if presence of the character was lost from the field of view of said scanning array and, when so determined, not to process that character.

2. The circuit according to claim 1 wherein said first means includes means for determining when the character moves vertically out the top of the scanning array and vertically out the bottom of the scanning array.

3. The circuit according to claim 1, wherein said first means includes at least one gate, the input to which includes a first signal indicative that the first row of said multirow array is being scanned, and a second signal indicative that a part of a character is in the first row, a flip-flop circuit triggered upon receiving a signal from said gate, a second gate and a second flip-flop, said second gate outputting a signal to said second flip-flop when the input to said second gate is an output from said first flip-flop and a signal indicating that a character is present in the field of view of said array.

4. In an optical reading system wherein the presence of a character is recognized and the character is read within the field of view of a scanner having a plurality of photo sensitive elements, a circuit for remembering character presence when a character temporarily extends out the top or bottom of the field of view of the scanner, comprising, first means for maintaining character presence when the top of a character extends out of the field of view of the scanner, second means for maintaining character presence when the bottom of the character extends out of the field of view of the scanner and means within each of said first and second means to output a signal which prevents the reading of a character when character presence is lost.

* * * * *